United States Patent [19]

Waters et al.

[11] Patent Number: 4,596,446
[45] Date of Patent: Jun. 24, 1986

[54] LIQUID CRYSTAL DEVICES WITH PARTICULAR CHOLESTERIC PITCH-CELL THICKNESS RATIO

[75] Inventors: Colin M. Waters; Edward P. Raynes, both of Malvern, England

[73] Assignee: The Secretary of State for Defence in Her Britannic Majesty's Government of the United Kingdom of Great Britain and Northern Ireland, London, England

[21] Appl. No.: 505,176

[22] Filed: Jun. 17, 1983

[30] Foreign Application Priority Data

Jun. 29, 1982 [GB] United Kingdom ............... 8218821

[51] Int. Cl.⁴ .................................. G02F 1/13
[52] U.S. Cl. ............................. 350/346; 350/341; 350/349; 350/350 R
[58] Field of Search .................. 350/346, 341, 349

[56] References Cited

U.S. PATENT DOCUMENTS

| | | | |
|---|---|---|---|
| 3,833,287 | 9/1974 | Taylor et al. | 350/349 |
| 4,143,947 | 3/1979 | Aftergut et al. | 350/334 |
| 4,241,339 | 12/1980 | Ushiyama | 350/349 X |
| 4,272,162 | 6/1981 | Togashi et al. | 350/349 |

FOREIGN PATENT DOCUMENTS

| | | |
|---|---|---|
| 0043603 | of 0000 | European Pat. Off. . |
| 7718465 | of 0000 | France . |
| 55-25006 | 2/1980 | Japan ............... 350/341 |
| 2017327 | 10/1979 | United Kingdom . |

OTHER PUBLICATIONS

Patent Abstracts of Japan, vol. 6, No. 46, Mar. 24, 1982.
Applied Physics Letters, vol. 37, No. 1, pp. 109–111.
IEEE Transactions On Electron Devices, vol. ED-28, No. 6, Jun. 1981, pp. 719–725.
Ishibashi, T. et al., "On the Multiplexing of the Phase Change Type Color LCD," 1980 *Biennial Display Research Conference*, IEEE (Oct. 1980), pp. 186–188.

*Primary Examiner*—John K. Corbin
*Assistant Examiner*—Richard F. Gallivan
*Attorney, Agent, or Firm*—Cushman, Darby & Cushman

[57] ABSTRACT

A liquid crystal device comprises a layer of long pitch cholesteric liquid crystal material incorporating a pleochroic dye. The layer is contained between two cell walls surface treated to align liquid crystal molecules in a tilted homogeneous structure. The surface alignment and natural pitch of the cholesteric material are matched to provide a progressive molecular twist of between $\pi$ and $2\pi$, preferably about $3\pi/2$, with a uniform tilt direction. The ratio natural pitch P divided by thickness d of the liquid crystal layer is arranged to lie between 0.5 and 1.0, with a value of d less than 20 $\mu$m. Both low tilt and high tilt surface alignment may be used separately or in combination. Polarizers may be used to enhance between ON and OFF states. The device has a sharp transmission/voltage characteristic which enables it to be used in large multiplex addressed matrix displays.

10 Claims, 10 Drawing Figures

LIQUID CRYSTAL DEVICES WITH PARTICULAR CHOLESTERIC PITCH-CELL THICKNESS RATIO

BACKGROUND AND SUMMARY OF THE PRESENT INVENTION

This invention relates to liquid crystal devices. Such devices typically comprise a thin layer of a liquid crystal material contained between glass slides. Electrode structures on the slides allow an electric field to be applied across the layer causing a re-ordering of the liquid crystal molecules to an ON-state. On removing the electric field the molecules relax back to their OFF state.

There are three known types of liquid crystal material, nematic, cholesteric, and smectic each having a different molecular ordering.

The present invention utilises a long-pitch cholesteric mixture in which the molecules naturally adopt a helical structure with the helix axes normal to the plane of the layer. The long-pitch cholesteric mixture is formed by mixing typically a few percent of a cholesteric liquid crystal material with a nematic liquid crystal. The pitch of the cholesteric mixture can be controlled by adjusting the concentration of the cholesteric liquid crystal material.

One known device is the twisted nematic device which uses a thin layer of a nematic material between glass slides. The slides are unidirectionally rubbed and assembled with the rubbing directions orthogonal. The rubbing gives a surface alignment to the liquid crystal molecules resulting in a progressive 90° twist across the layer. When placed between polarisers, with their optical axis perpendicular or parallel to a rubbing direction the device rotates the plane of polarised light in its OFF state and transmits without rotation in the ON state. Small amounts of cholesteric have been added to the nematic material to ensure the 90° twist is of the same sense across the whole area of the device as explained in U.K. Pat. Nos. 1,472,247 and 1,478,592.

A known type of device employing short-pitch cholesteric material is the phase change device. In its OFF, zero applied voltage, state the material is scattering to light. The cholesteric pitch is very small in comparison to the layer thickness. When an above threshold voltage is applied across the layer its molecules rotate from their helical structure to lie parallel to the applied field. This is similar to the ON state of a positive nematic and is light transparent. On removing the voltage the material relaxes back to its light scattering OFF state. No cell wall surface alignment is necessary with this type of device. An advantage of this device is the fast turn OFF time compared with the twisted nematic device and wide angle of view.

Another type of cell utilises a cholesteric material whose pitch equals the layer thickness. With homogeneous boundary conditions a plan state is induced with a $2\pi$ rotation of the director across the layer. Inclusion of a pleochroic dye produces absorption of light in the OFF state. Application of a voltage re-orientates the liquid crystal and dye molecules giving higher transmission in the ON state. As the voltage is increased to just above threshold a scattering texture is formed, which clears after a further, substantial, increase of voltage to give the ON state. As the voltage is reduced there is a rapid reduction in transmission at the threshold voltage. The device therefore always shows significant hysteresis which is present irrespective of the rate of increase of voltage. This hysteresis limits the multiplexibility of this device. This device is described in I.E.E.E. Trans. on Electron Devices, Vol. ED 28 No. 6, June 1981, pp. 719–823.

It has now been found that certain cholesteric liquid crystal cells incorporating a pleochroic dye and having about a $3\pi/2$ twist exhibit a sharp transmission-voltage characteristic for rapidly increasing voltages, without hysteresis. A slow increase in voltage may still produce some hysteresis.

According to this invention a liquid crystal device comprises a layer of long pitch cholesteric liquid crystal material of positive dielectric anisotropy and incorporating an amount of a pleochroic dye contained between two cell walls bearing electrode structures and being surface treated to align liquid crystal molecules in a tilted homogeneous structure characterised in that the surface alignment and natural pitch p of the cholesteric material are matched to provide a progressive molecular twist of greater than $\pi$ and less than $2\pi$ radians across the layer with a uniform tilt direction, the ratio of layer thickness d divided by pitch p lying between 0.5 and 1.0 with a value of d less than 20 $\mu$m whereby the device may be switched directly between a light transmissive ON state and a non transmissive OFF state with a sharp transmission/voltage chracteristics without substantial hysteresis.

The amount of twist is preferably around $3\pi/2$. The surface alignment treatment results in a molecular tilt of between 0° and 30° or more but less than 90° (hemeotropic alignment). A tilt of less than say 5° e.g. 2° may be termed low tilt and between say 5° and 70° termed a high tilt. Both low and high tilt may be used singly or in combination.

The device may operate in a transmissive mode or with a reflector in a reflective mode both with or without neutral or coloured polarisers.

Two or more devices may be arranged in series. This arrangement may use different colour dyes in each device so that a total of three colours may be observed. Alternatively the dyes may be similar so that a single colour of enhanced contrast between OFF and ON states is obtained. Furthermore each cell may have a different absorption so that eight values of absorption or grey scale are obtained.

Usually the pitch of a cholesteric liquid crystal increases with increasing temperature. The device may be enhanced by either
  (i) choosing a liquid crystal material, or mixture of materials, with small or zero temperature dependence of pitch to maintain the optimum d/p over a wide temperature range; or
  (ii) choosing a liquid crystal whose pitch decreases with increasing temperature to partially or wholly compensate for variations in threshold voltage with temperature.

Additionally, or instead, the liquid crystal temperature may be sensed and the addressing voltage levels altered accordingly. One method of sensing is described in U.K. Pat. No. 2,012,093 B.

BRIEF DESCRIPTION OF THE ACCOMPANYING DRAWINGS

The invention will now be described by way of example only with reference to the accompanying drawings of which.

DETAILED DESCRIPTION OF THE PREFERRED EXEMPLARY EMBODIMENTS

Figure 1:
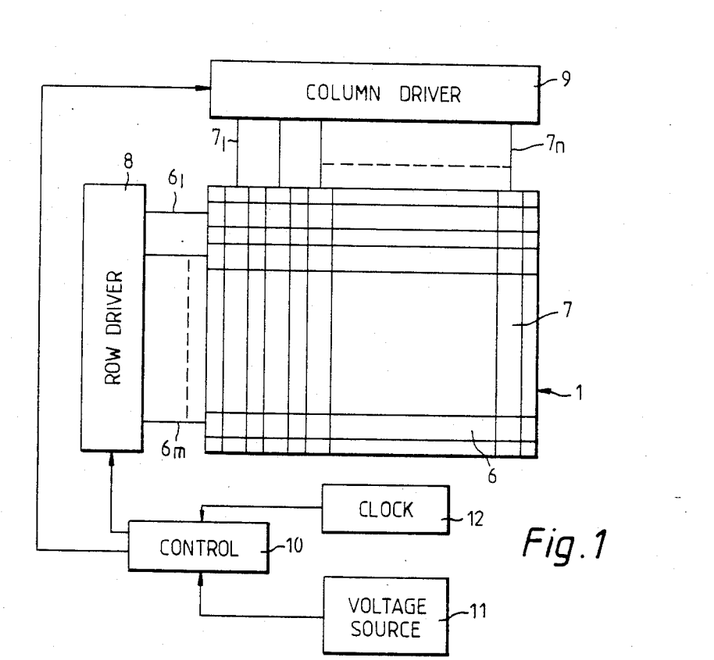
FIG. 1 is a plan view of a matrix multiplex addressed liquid crystal display.
Figure 2:
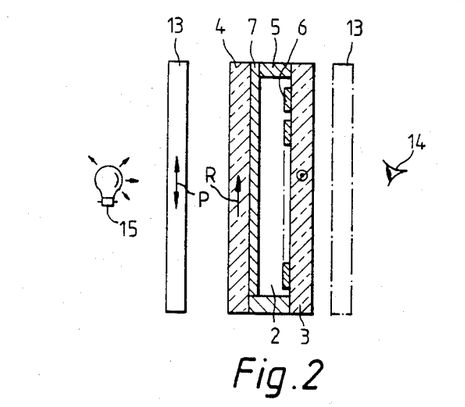
FIG. 2 is a cross section of a display such as FIG. 1 used in a transmissive mode.

The display of FIGS. 1, 2 comprises a liquid crystal cell 1 formed by a layer 2 of cholesteric liquid crystal material contained between glass walls 3, 4. A spacer ring 5 maintains the walls typically 6 μm apart. Additionally numerous short lengths of 6 μm diameter glass fibre may be dispersed in the liquid crystal material to maintain an accurate wall spacing. Strip like row electrodes $6_1$ to $6_m$, e.g. of SnO$_2$, are formed on one wall 3 and similar column electrodes $7_1$ to $7_n$ formed on the other wall 4. With m-row electrodes and n-column electrodes this forms an m x n matrix of addressable elements. Each element is formed by the interaction of a row and column electrode.

A row driver supplies voltage to each row electrode 6. Similarly a column drive 9 supplies voltages to each column electrode 7. Control of applied voltages is form a control logic 10 which receives power from a voltage source 11 and timing from a clock 12.

In liquid crystal displays the ON and OFF states are visibly different. This is used for example to show digits as in watches, etc.

There are two conventional techniques for multiplex addressing displays, a so-called slow scan and a fast scan or r.m.s. mode. In the slow scan mode each element in a matrix is addressed with a voltage for a time sufficient to turn that element ON. This is repeated for each line of the matrix and then the whole matrix is re-addressed or refreshed repeatedly. In the fast scan mode each element required to be ON is addressed once per complete refresh cycle with a higher voltage level for a time less than the response time of the liquid crystal material and during the remainder of the refresh cycle receives a lower voltage. These voltages are set so that the r.m.s. level over many cycles is sufficiently high to maintain the required elements ON. Elsewhere the r.m.s. level is insufficient to cause elements to be in the ON state.

As an example of fast scan addressing an A.C. row voltage $V_R$ is applied to each row in turn. As each row is addressed column voltages $\pm V_C$ are applied to appropriate column electrodes, the $\pm$ signs refer to the phase of the A.C. signal e.g. at 1 KHz. This is repeated for each row until the whole cell is addressed. The process is repeated for the whole cell at a frame rate typically of 50 Hz for a 10 line matrix whilst information is to be displayed. Each element required to be ON receives $V_R+V_C$ for one time interval per complete addressing cycle, i.e. frame time, and $\pm V_C$ for other time intervals. The r.m.s. value of $V_R+V_C$ and $n-1(\pm V_C)$ is arranged to equal a desired $V_2$ level. Elements not required to be ON receive $V_C$, or $V_R-V_C$ for all time periods. The r.m.s. value of $V_C$, $V_R-V_C$ is $V_1$. The display is formed collectively by ON elements receiving $V_2$ volts on a background of OFF elements receiving $V_1$ volts.

Alternatively the display may be collectively formed by OFF elements on a background of ON elements.

To multiplex address a display having a large numbers of lines the ON/OFF transmission voltage characteristic must be very sharp, since the OFF elements in the display have to be held at a voltage $V_1$ which is only slightly lower than the ON voltage $V_2$. The number of lines, n, (or level of multiplexing) that can be addressed can be related to the ratio of $V_1$, $V_2$ voltages. For example for the optimised Alt and Pleschko addressing scheme (I.E.E.E. Trans. ED Vol. ED 21 1974 pp 146-155), $$\left(\frac{V_2}{V_1}\right)^2 = \frac{\sqrt{n}+1}{\sqrt{n}-1}$$

Decreasing $V_2-V_1$ increases the value of n.

Present displays using the twisted nematic or Schadt Helfrich effect without dyes can be multiplexed about 32 ways (n=32). However dyed displays have previously been limited to around n=3. As explained below displays of the present invention provide sharp ON/OFF transmission characteristics and hence high values of n.

The display of FIG. 1 has been arranged as an orthogonal m x n matrix but may be arranged in other layouts. For example an eight bar digit can be displayed by a three row by three column matrix and multiplex addressed. The digits can be extended to a row of digit by adding column electrodes in groups of three.

For a transmissive display FIG. 2 a polariser 13 may be arranged behind, or in front of the cell 1. The polarisation axis P of the polariser is parallel with the surface alignment direction R (see below) on the adjacent cell walls. An observer 14 views the display illuminated by e.g. a tungsten bulb 15.

Figure 3:
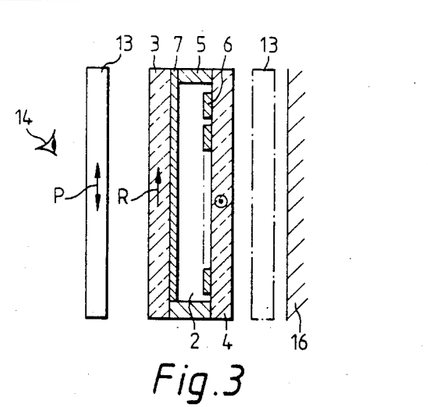
FIG. 3 is similar to FIG. 2 but operates in a reflective mode.

FIG. 3 shows a display having a reflector 16 behind the cell. A polariser 13 is mounted in front of or behind the cell 1 with its polarisation axis P parallel to the alignment direction R of the adjacent wall.

As seen in FIG. 2, 3 the components are separated. In practice they are in contact with one another. For example the reflector 16 may be a layer of aluminum sprayed or evaporated onto the rear cell wall 4.

The cholesteric material used naturally forms a helical ordering in the layer 2 with the helical axis normal to the walls 3, 4.

Liquid crystal molecules can be aligned at the cell wall surface by various alignment techniques. For example coating the surface with polyvinyl alcohol and unidirectional rubbing with a soft tissue. This results in a molecular alignment along the rubbing direction and with a tilt of the molecules of about 2° to the surface. Alternatively, as described in U.K. Pat. Nos. 1,472,247, 1,478,592, 1,545,084, and 2,007,865 A MgF$_2$ may be evaporated onto the walls. Depending on the angle of evaporation, single or sequentially, the molecules are aligned and the angle of tilt may vary between zero and 30° or more.

The cell is constructed to have a $3\pi/2$ molecular twist across the layer. Thus the two alignment directions on the assembled cell must be orthogonal. The cholesteric pitch p is chosen so that for a layer thickness d the molecules twist across the layer by $3\pi/2$ i.e. d/p is 0.75. such a value of d/p matches the natural cholesteric twist to the surface alignment twist. It has been found that values of d/p may lie between 0.5 to 1.0.

As noted above surface alignment by rubbing results in a surface molecules tilt of about 2°. The relative orientation of the two rubbing directions must be matched to the natural cholesteric rotation which may be left or right handed. The need for this matching is explained with reference to FIGS. 4, 5.

Figure 4:
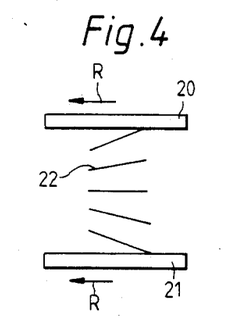
FIGS. 4, 5 are schematic views of parallel aligned cell walls for explaining the matching of alignment.

In FIG. 4 cell walls 20, 21 are unidirectionally rubbed and assembled with the rubbing R in the same directions. For this cell the liquid crystal material is a nematic material, it is not optically active i.e. has no twisted structure. The liquid crystal molecules 22 are splayed, they are inclined towards the centre of the layer. When a voltage is applied the molecules rotate to align normal to the walls. Some molecules rotate clockwise others anti-clockwise to the ON state. This is the problem of reverse tip referred to in the prior art. It gives rise to a patchy appearance to the display.

Figure 5:
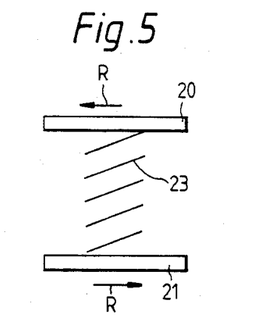

FIG. 5 is similar to FIG. 4 except that the rubbing directions are opposite. This results in liquid crystal molecules 23 all inclined in the same direction towards one wall in the OFF state. When a voltage is applied all molecules rotate in the same direction to give a uniform appearance.

Figure 6:
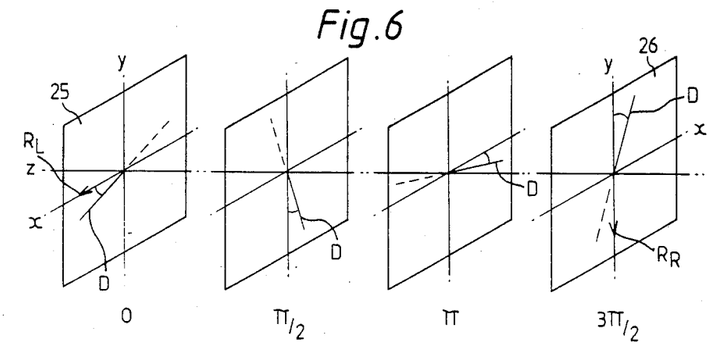
FIG. 6 is a diagrammatic view showing matching surface alignment and cholesteric twist directions.

FIG. 6 shows how the cholesteric twist and alignments are matched. Left plane 25 and right plane 26 have rubbing directions $R_L$ and $R_R$ respectively. Viewed from the left $R_R$ is rotated anti-clockwise $3\pi/2$ from $R_L$. Passing from left to right the director is rotated clockwise by $3\pi/2$. The tilt angle across the centre of the layer is uniform. Intermediate planes are indicated for $\pi/2$ and $\pi$ rotation. For a cholesteric that twists anticlockwise on passing through the layer the rubbing direction $R_L$ is reversed. The orientation of the rubbing directions is critical. If one of the rubbing directions is opposite to that indicated in FIG. 6 then there is a significant degradation in the sharpness of the electro-optic transmission curve.

Figure 7:
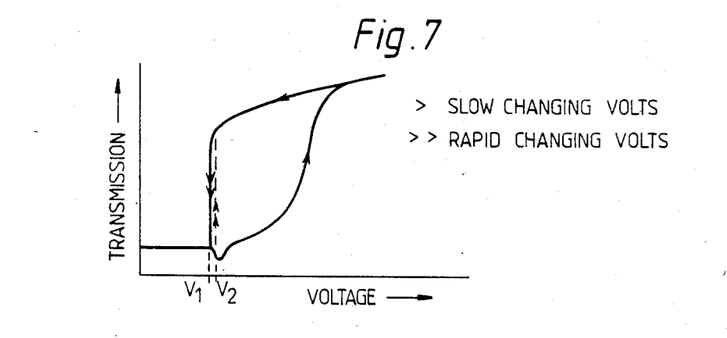
FIG. 7 is a graph showing transmissions of voltage characteristic for $3\pi/2$ single polariser dye display with low tilt surface alignment.

The transmission against applied voltage characteristic for a low tilt (e.g. 2°) 6 $\mu$m cell with a $3\pi/2$ twist incorporating a dye and using a single polariser shown in FIG. 7. The lower curve shows transmission changes with a slowly increasing voltage, the upper curve shows transmission changes with a decreasing voltage. The decreasing voltage curve is obtained for both slow and fast reduction in voltage. A surprising effect is that for a rapid increase in voltage from $V_1$ to $V_2$, marked by a broken line, the transmission charge closely follows the upper curve. $V_1$ is below the steep ramp of the two closely spaced lines and $V_2$ is just above it. The display of FIG. 1 is operated using R.M.S. values of $V_1$ and $V_2$ for OFF and ON elements respectively.

In the OFF state very little light is transmitted whilst substantially all of the light is transmitted in the ON state. For a liquid crystal material having a reasonably high birefringence (e.g. $\Delta n \gtrsim 0.15$) there is guiding of polarised light in the OFF state. If light from a source enters the layer polarised along the molecular axis of the liquid crystal and dye molecules and in a direction normal to this axis, it is both guided and absorbed across the layer. When the birefringence is low (e.g. $\Delta n \lesssim 0.15$) there is less guiding of polarised light, and a larger fraction of unpolarised light may be absorbed by the dye molecules allowing the device to be operated without a polariser.

When the cell is in the ON state the liquid crystal and due molecules are re-oriented towards the normal to the walls, provided the material has positive dielectric anisotropy ($\Delta E > 0$). In this condition little light is absorbed by the dye.

For high birefringence materials ($\Delta n \gtrsim 0.15$) it is preferable to use a single polariser to increase the absorption in the OFF state. For low birefringence ($\Delta n \lesssim 0.15$) it is preferable to use no polarisers to produce a brighter ON state.

For high birefringence materials and layers of 12 $\mu$m or more a polarisation switch effect (c.f. the $\pi/2$ twisted nematic) is obtainable without a dye by using the cell between two polarisers.

Figure 9:
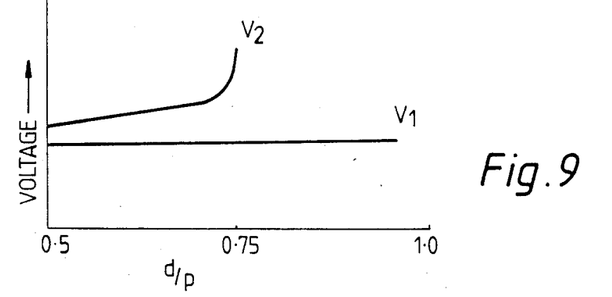
FIG. 9 is a graph showing cell switching voltages against d/p ratio for a low tilt cell surface alignment.

FIG. 9 shows the effect of varying the ratio d/p in the low tilt cell whose transmission characteristics are shown in FIG. 7. As the layer thickness d to cholesteric pitch p increases above 0.5 the value of $V_1$ remains reasonably constant. However, the value of $V_2$ increases gradually up to about d/p of 0.75 and then increases markedly. Thus for low tilt cells the value of d/p is preferably within the range 0.5 to 0.75. The additional strain induced by the surfaces at values of d/p<0.75 for a $3\pi/2$ twist, reduces the tendency of the cell to form a scattering texture just above the threshold voltage $V_1$.

Figure 8:
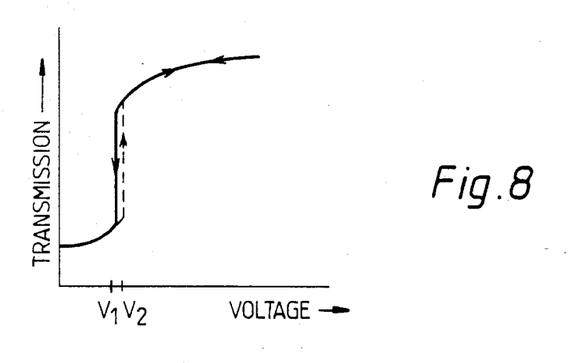
FIG. 8 is similar to FIG. 7 but for a high tilt cell.
Figure 10:
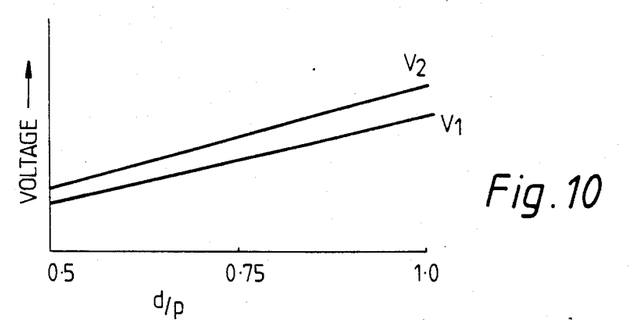
FIG. 10 is a graph showing cell switching voltages against d/p ratio for a high tilt cell surface alignment.

Cells of $3\pi/2$ twist with surface alignments having high tilts, e.g. 30°, have a transmission characteristic shown in FIG. 8. For applied voltages above $V_1$ the transmission changes rapidly with little hysteresis both for slowly and rapidly increasing and decreasing voltages. For this high tilt cell the variation of $V_1$ and $V_2$ with varying d/p is shown in FIG. 10. Both $V_1$ and $V_2$ increase steadily with increasing d/p. Similar results obtain when the tilts are different on the two cell walls. For example one tilt may be zero or 2° and the other 30° with alignment matched to the twist direction as in FIG. 6.

The invention may be operated as a multiplexed matrix array as described above with reference to FIG. 1 or as a fixed legend display.

This device may be operated in a two-frequency mode where the cell is switched ON by a low frequency signal $f_1$ and switched OFF by a high frequency $f_h$. The signal $f_1 < f_c < f_h$ where $f_c$ is the frequency at which the dielectric anisotropy of the liquid crystal material changes sign being positive at low frequencies to negative at high frequencies.

Examples of suitable liquid crystal materials are:

Catalogue Nos. E63, E70, E43, CB 15 available from B.D.H. Ltd., Poole, Dorset, England.

Biphenyl liquid crystal materials are described in U.K. Patent No. 1,433,130 and U.K. Patent Application No. 2,031,010 A. ZLI 1132 available from E. Merck, Damstadt, W. Germany.

Suitable dyes are anthraquinone dyes described in U.K. Patent Applications Nos. 2,011,940 A, 2,082,196 A, 2,081,736 A, 2,093,475 A, available from I.C.I. Ltd., or from B.D.H. Chemicals Ltd. as D82, D86.

EXAMPLE 1

Material E63+1.5% by weight of CB 15+1% Dye D82 (B.D.H.)

Cell thickness 6 $\mu$m, low tilt alignment $V_2/V_1$ at temperature $T=20°=1.165$ Maximum number, n, of lines which may be multiplexed using the Alt & Pleshko technique: $n=40$ $$\frac{1}{V}\left(\frac{dV}{dT}\right) \simeq 0.5\% \text{ per }°C.$$

Response time
$t_{ON} \simeq 500$ ms
$t_{OFF} \delta 300$ ms
Contrast ratio 4:1.

The angle of view is extremely good with or without a polariser.

EXAMPLE 2

Liquid crystal cell thickness 8 μm, low tilt alignment
Materials ZLI 1289 (Merck)
+ME 33 30% by weight (Merck)
+CB 15 1% by weight (B.D.H.)
+D 82 dye 1% by weight (B.D.H.)
$(V_2/V_1)_{T=20°}=1.160$
$n=46$

EXAMPLE 3

Cell thickness 8 μm low tilt alignment
Materials (B.D.H.) 3/5/7 CB
+CB 15 1% by weight
+D 82 dye 1% by weight
$(V_2/V_1)_{T=20°}=1.125$
$n=72$

EXAMPLE 4

Cell thickness 8 μm, low tilt alignment
Material (B.D.H.) 3/5/7 CB 50% by weight
+3/5/7 CNPYR 50% by weight
$(V_2/V_1)_{T=20°}=1.072$
$n=200$

EXAMPLE 5

Cell thickness 8 μm, low tilt alignment on one wall and high tilt alignment on the other wall.
Material ZLI 1557 (Merck)
+CB 15 0.9% by weight (B.D.H.)
+D 82 dye 1% by weight (B.D.H.)
$(V_2/V_1)_{T=20°}=1.063$
$n=268$

EXAMPLE 6

Cell thickness 8 μm, low/high tilt alignment
Material (B.D.H.) E 63
+CB 15 1.1% by weight
+D 82 dye 1% by weight
$(V_2/V_1)_{T=20°}=1.141$
$n=58$

EXAMPLE 7

Cell thickness 8 μm, low/high tilt alignment.
Material (B.D.H.) 3/5/7 PECH
+CB 15 1% by weight
+D 82 dye 1% by weight
$(V_2/V_1)_{T=20°}=1.134$
$n=64$

EXAMPLE 8

Cell thickness 8 μm, high tilt alignment
Material ZLI 1557 (Merck)
+CB 15 0.9% by weight (B.D.H.)
+D 82 dye 1% by weight (B.D.H.)
$(V_2/V_1)_{T=20°}=1.042$
$n=590$

EXAMPLE 9

Cell thickness 8 μm, high tilt alignment
Material ZLI 1289 (Merck)
+BCO Ester 30% by weight (B.D.H.)
+CB 15 1.1% by weight (B.D.H.)
+D 82 dye 1% by weight (B.D.H.)
$(V_2/V_1)_{T=20°}=1.075$
$n=190$

EXAMPLE 10

Cell thickness 8 μm, high tilt alignment
Material (B.D.H.) E 120
+CB 15 0.75% by weight
+D 82 dye 1% by weight
$(V_2/V_1)_{T=20°}=1.08$
$n=170$

Table of properties of liquid crystal materials.

| Material | $\frac{k_{33}}{k_{11}}$ | $\frac{\Delta\epsilon}{\epsilon_1}$ |
|---|---|---|
| ZLI 1289 (Merck) | 2.01 | 2.28 |
| ZLI 1289 + 30% ME 33 | 1.23 | 1.87 |
| ZLI 1289 + 30% BCO Ester | 1.30 | 2.0 |
| E 120 | 1.01 | 1.09 |
| 3/5/7 CB | 1.55 | 2.91 |
| E 63 | 1.93 | 3.19 |
| 3/5/7 PECH | 2.08 | 2.7 |

ME 33 is

BCO Ester is

3/5/7 CB is

3/5/7 PECH is

-continued

| Material | $\frac{k_{33}}{k_{11}}$ | $\frac{\Delta\epsilon}{\epsilon_1}$ |
|---|---|---|

C₃H₇—(H)—C₂H₄—(⌬)—CN  30%

C₅H₁₁—(H)—C₂H₄—(⌬)—CN  40%

C₇H₁₅—(H)—C₂H₄—(⌬)—CN  30%

3/5/7 CNPYR is

C₃H₇—(N⌬N)—(⌬)—CN  30%

C₅H₁₁—(N⌬N)—(⌬)—CN  40%

C₇H₁₅—(N⌬N)—(⌬)—CN  30%

CB 15 is

CH₃CH₂CHCH₂—(⌬)—(⌬)—CN
         |
        CH₃

We claim:

1. A liquid crystal display device comprising:
a layer of positive dielectric anisotropy cholesteric liquid crystal material of natural pitch p and thickness d less than 20 μm contained between two parallel spaced cell walls, electrode structures on both cell walls arranged to form a plurality of addressable elements, a surface treatment on both cells wall in contact with the liquid crystal material to align liquid crystal molecules in a tilted homogeneous structure,
said surface alignment being matched to said cholesteric material to provide a progressive molecular twist of greater than $\pi$ and less than $2\pi$ radians across said layer with a uniform tilt direction, the ratio of layer thickness d divided by pitch p laying between 0.5 and 1.0, said device further comprising means for selectively absorbing transmitted light depending on the molecular orientation of the liquid crystal material, two sets of driver circuits and a controlling logic circuit for repetitively applying voltage from a voltage source to the electrode structures in a multiplexed sequence, wherein
each of said addressable elements may be switched directly between a light transmissive state and a nontransmissive state with a sharp transmission/voltage characteristic without substantial hysteresis.

2. The device of claim 1 wherein the means for selectively absorbing transmitted light is an amount of pleochroic dye incorporated in the liquid crystal material.

3. The device of claim 2 and further comprising at least one polariser.

4. The device of claim 1 wherein the means for selectively absorbing transmitted light is two polarisers arranged optically in front of and behind the layer of liquid crystal material.

5. The device of claim 1 wherein the molecular twist is about $3\pi/2$.

6. The device of claim 1 wherein the surface treatment provides a liquid crystal molecular tilt up to 5° and the ratio d/p lies between 0.5 and 0.75.

7. The device of claim 1 wherein the surface treatment provides a liquid crystal molecular tilt of between 5° and 70° on at least one cell wall.

8. The device of claim 1 and further comprising a reflector optically behind the cell.

9. The device of claim 1 arranged optically in series with at least one other device of claim 1 with different colour dyes in the different cells.

10. The device of claim 1 wherein the electrode structure on one cell wall is arranged in a first series of m separate electrodes and the electrode structure on the other cell wall is arranged in a second series of n separate electrodes to form an m x n matrix of separate addressable elements.

* * * * *

UNITED STATES PATENT AND TRADEMARK OFFICE
CERTIFICATE OF CORRECTION

PATENT NO.   : B1 4,596,446
DATED        : April 12, 1994
INVENTOR(S)  : Waters et al.

Page 1 of 5

It is certified that error appears in the above-identified patent and that said letters patent is hereby corrected as shown below:

On the title page, item [56]: References Cited

Under "U.S. Patent Documents", please insert the following reference:

--4,634,229   1/1987   Amstutz--.

Under "Forign Patent Documents", please insert the following references:

| | | |
|---|---|---|
| --21 58 563 | 10/1975 | Germany |
| 2 076 554 | 12/1981 | United Kingdom |
| 2 087 583 | 5/1982 | United Kingdom |
| 2 108 698 | 5/1983 | United Kingdom |
| 2 127 169 | 4/1984 | United Kingdom |
| 2 143 336 | 2/1985 | United Kingdom |
| 2 145 837 | 4/1985 | United Kingdom |
| 2 356 173 | 1/1978 | France |
| 50-138851 | 11/1975 | Japan |
| 52-79948 | 7/1977 | Japan |
| 52-108838 | 9/1977 | Japan |
| 54-115143 | 9/1979 | Japan |
| 55-127520 | 10/1980 | Japan |
| 55-146416 | 11/1980 | Japan |
| 56-125723 | 10/1981 | Japan |
| 56-162722 | 12/1981 | Japan |
| 57-133438 | 8/1982 | Japan |
| 58-10729 | 1/1983 | Japan |
| 58-118622 | 7/1983 | Japan-- |

UNITED STATES PATENT AND TRADEMARK OFFICE
CERTIFICATE OF CORRECTION

PATENT NO. : B1 4,596,446
DATED : April 12, 1994
INVENTOR(S) : Waters, et al.

It is certified that error appears in the above-indentified patent and that said Letters Patent is hereby corrected as shown below:

Under "OTHER PUBLICATIONS", please insert the following references:

—Needham; Phil. Trans. R. Soc. Lond. A 309, 179-188 (1983); "Practical limits on addressing twisted nematic displays"; pp 109-118

Scheffer; Phil. Trans. R. Soc. Lond. A 309, 189-201 (1983); "Guest-host devices using anisotropic dyes"; pp 119-131

Schadt et al.; IEEE Trans. on Electron Devices, Vol. ED-25, No. 9, (Sept. 1978); "Physical Properties of New Liquid-Crystal Mixtures and . . ."; pp 1125-1137

Togashi et al.; Mol. Cryst. Liq. Cryst., Vol. 59, (1981); "White and Taylor Type Guest Host Displays Without Scattering Effects Using the . . ."; pp 117-124

Waters et al.; Mol. Cryst. Liq. Cryst., Vol. 123, (1985); "Design of Highly Multiplexed Liquid Crystal Dye Displays"; pp 303-319

Brody et al.; IEEE Trans. on Electron Devices, Vol. ED-20, No. 11, (Nov. 1973); "A 6X6 Inch 20 Lines-per-Inch Liquid-Crystal Display Panel"; pp 995-1001

Heilmeier et al.; Applied Physics Letters, Vol. 13, No. 3, (Aug. 1968); "Guest-Host Interactions in Nematic Liquid Crystals. A New Electro-Optic Effect"; pp 91-92

White et al.; Journal of Applied Physics, Vol. 45, No. 11, 11/74; "New absorptive mode reflective liquid-crystal display device"; pp. 4718-4723

Gerber; Appl. Phys. 25, (1981); "Calculated Correlations Between Material Parameters and Electro-Optical Performance of Twisted . . ."; pp 259-268

Scheffer et al.; Appl. Phys. Lett. 45(10), 11/84; "A new, highly multiplexable liquid crystal display"; pp. 1021-1023

Goscianski; Journal of Applied Physics, Vol. 48, No. 4, 4/77; "Optical characteristics of twisted nematic liquid crystals: . . ."; pp 1426-1431

UNITED STATES PATENT AND TRADEMARK OFFICE
CERTIFICATE OF CORRECTION

PATENT NO. : B1 4,596,446
DATED : April 12, 1994
INVENTOR(S) : Waters, et al.

Page 3 of 5

It is certified that error appears in the above-indentified patent and that said Letters Patent is hereby corrected as shown below:

Heffner et al.; J. Appl. Phys. 53(12), 12/82; "Switching characteristics of a bistable cholesteric twist cell"; pp 8599-8606

Schadt et al.; Applied Physics, Vol. 16, No. 4, 2/71; "Voltage-Dependent Optical Activity of a Twisted Nematic Liquid Crystal"; pp. 127-128

Nara et al.; J. Appl. Phys. 49(7), 7/78; "Multiplexing for the guest-host mode using a nematic cholesteric mixture with a long pitch"; pp. 4277-4279

Gooch et al.; J. Phys. D: Appl. Phys., Vol. 8, (1975); "The optical properties of twisted nematic liquid crystal structures . . . "; pp 1575-1584

Scheffer et al.; J. Appl. Phys. 58(8), 10/85; "Investigation of the electro-optical properties of 270° chiral nematic . . . "; pp 3022-3031

Kahn; Mol. Cryst. Liq. Cryst., Vol. 38, (1977); "Capacitive Analysis of Twisted Nematic Liquid Crystal Displays"; pp. 109-123

Schadt et al.; Mol. Cryst. Liq. Cryst., Vol. 65, (1981); "Dielectric, Electro-Optical and Phase-Change Properties of Liquid Crystal . . . "; pp 241-264

Scheuble et al.; Mol. Cryst. Liq. Cryst., Vol. 68, (1981); "Elastic Properties of Liquid Crystalline Mixtures in Relation to Their Molecular Composition"; pp 57-67

Raynes; Mol. Cryst. Liq. Cryst. Letters, Vol. 4(3-4), (1987); "The Optical Properties of Supertwisted Liquid Crystal Layers"; pp 69-75

Raynes; Mol. Cryst. Liq. Cryst. Letters, Vol. 4(1), (1986); "The Theory of Supertwist Transitions"; pp 1-8

Baur; Mol. Cryst. Liq. Cryst., Vol. 63, (1981); "The Influence of Material and Device Parameters on the Optical Characteristics of Liquid . . . "; pp 45-58

Raynes et al.; Mol. Cryst. Liq. Cryst., Vol. 56, (1979); "Voltage Dependence of the Capacitance of a Twisted Nematic Liquid Crystal Layer"; pp 63-68

UNITED STATES PATENT AND TRADEMARK OFFICE
CERTIFICATE OF CORRECTION

PATENT NO. : B1 4,596,446
DATED : April 12, 1994
INVENTOR(S) : Waters et al.

It is certified that error appears in the above-identified patent and that said letters patent is hereby corrected as shown below:

Deuling; Mol. Cryst. Liq. Cryst., Vol. 19, (1972); "Deformation of Nematic Liquid Crystals in an Electric Field"; pp 123-131

Berreman et al.; Proceedings of the SID, Vol. 22/3, (1981); "Disclination-Free Bistable Twist Cells"; pp 191-193

Bos et al.; SID 83 Digest, (1983); 6.2/11:25 A.M.: "A Liquid-Crystal Optical-Switching Device . . ."; pp 30-31

Kinugawa et al.; SID 86 Digest, (1986); 8.1: "640 x 400 Pixel LCD Using Highly Twisted Birefringence Effect with Low Pretilt Angle"; pp 122-125

Waters et al.; Proceedings of the SID, Vol. 25/4, (1984); "Highly Multiplexable Dyed LCDs"; pp 261-264

Scheffer; Adv. in Liq. Cry. Res. and Applns., (1980); "Bistability effects in twisted nematic layers"; pp 1145-1153

Nehring; Adv. in Liq. Cry. Res. and Applns., (1980); "Matrix-addressed liquid-crystal displays"; pp 1155-1178

Arai; Thesis for Degree of Master of Engineering, 3/80; "Study on 270° Twisted Nematic Liquid-Crystal Cells";

Shimoda et al.; The Physics and Chemistry of Liquid Crystal Devices, (1980); "Anchoring Properties of Liquid Crrystals at the Substrates: . . ."; pp 246-247

Raynes; Electronics Letters, Vol. 10, No. 9, 5/74; "Improved Contrast Uniformity in Twisted Nematic Liquid-Crystal Electro-optic Display Devices"; pp 141-142

Berreman; Nonemissive Electrooptic Displays, (1976); "Electrical and Optical Properties of Twisted Nematic Structures"; pp 9-24

UNITED STATES PATENT AND TRADEMARK OFFICE
CERTIFICATE OF CORRECTION

PATENT NO. : B1 4,596,446
DATED : April 12, 1994
INVENTOR(S) : Waters et al.

It is certified that error appears in the above-identified patent and that said letters patent is hereby corrected as shown below:

Gray; Critical Reports on Applied Chemistry, Vol. 22; "Thermotropic Liquid Crystals"; pp 76-85

Schadt et al.; "Class Specific Physical Properties of Liquid Crystals and Correlations with Molecular Structure and Static . . . ", 2/82; pp 165-178

Hiroshima et al.; 26th Applied Physics and Related Subjects Conference; 30p-B-5, 3/79; "The characteristics of 270° Twist Cells", pp 1-2.

Arai et al.; 5th Liquid Crystal Discussion Group, 1Q13, 10/79; "The Characteristics of 270° Twist Cells (Report 2)", pp 1-5.

Hiroshima et al.; 27th Applied Physics and Related Subjects Conference; 1p-R-6, 10/80; "The Characteristics of 270° Twist Cells (Report 3)", pp 1-3.

Birecki et al.; The physics and Chemistry of Liquid Crystal Devices, (1980); "Effects of Cel and Material Properties on Multiplexing . . . "; pp 125-142

Ishii et al.; 3W18 "Characteristics of White-Taylor GH-LCD Using a Long Pitch Liquid Crystal", 10/82; pp 126-127--.

Signed and Sealed this

Sixteenth Day of July, 1996

Attest:

BRUCE LEHMAN

*Attesting Officer*     *Commissioner of Patents and Trademarks*

REEXAMINATION CERTIFICATE (2268th)
United States Patent [19]
Waters et al.

[11] B1 4,596,446
[45] Certificate Issued Apr. 12, 1994

[54] LIQUID CRYSTAL DEVICES WITH PARTICULAR CHOLESTERIC PITCH-CELL THICKNESS RATIO

[75] Inventors: Colin M. Waters; Edward P. Raynes, both of Malvern, England

[73] Assignee: The secretary of State for Her Defence in Her Britannic Majesty's Government the United Kingdom of Great Britain and Northern Ireland, London, United Kingdom

Reexamination Request:
No. 90/003,040, Apr. 30, 1993

Reexamination Certificate for:
Patent No.: 4,596,446
Issued: Jun. 24, 1986
Appl. No.: 505,176
Filed: Jun. 17, 1983

[30] Foreign Application Priority Data
Jun. 29, 1982 [GB] United Kingdom ............... 8218821

[51] Int. Cl.$^5$ ............... G02F 1/1343; G02F 1/1337; G02F 1/13
[52] U.S. Cl. ............... 359/55; 359/75; 359/98; 359/101
[58] Field of Search ............... 359/101, 98, 102, 55, 359/75

[56] References Cited
U.S. PATENT DOCUMENTS 3,731,986  5/1973  Fergason .
3,833,287  9/1974  Taylor et al. ............... 359/98
3,837,730  9/1974  Hatfield et al. .
3,936,815  2/1976  Kogure et al. .
4,016,094  4/1977  Tsukamoto et al. .
4,241,339  12/1980  Ushiyama .

FOREIGN PATENT DOCUMENTS

50-084257  7/1975  Japan .
56-156816  12/1981  Japan .
56-168636  12/1981  Japan .

OTHER PUBLICATIONS

B. Lechner et al., "Liquid Crystal Matrix Displays," Proceedings of the IEEE, vol. 59, No. 11, pp. 1566–1579 (Nov. 1971).
A. R. Kmetz, "Matrix Addressing of Non-Emissive Displays," Non-Emissive Electro-Optic Displays, pp. 261–289 (1976).

*Primary Examiner*—Anita Pellman Gross

[57] ABSTRACT

A liquid crystal device comprises a layer of long pitch cholesteric liquid crystal material incorporating a pleochroic dye. The layer is contained between two cell walls surface treated to align liquid crystal molecules in a tilted homogeneous structure. The surface alignment and natural pitch of the cholesteric material are matched to provide a progressive molecular twist of between $\pi$ and $2\pi$, preferably about $3\pi/2$, with a uniform tilt direction. The ratio natural pitch P divided by thickness d of the liquid crystal layer is arranged to lie between 0.5 and 1.0, with a value of d less than 20 $\mu$m. Both low tilt and high tilt surface alignment may be used separately or in combination. Polarizers may be used to enhance between ON and OFF states. The device has a sharp transmission/voltage characteristic which enables it to be used in large multiplex addressed matrix displays.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11, 12, and 13 are added and determined to be patentable.

*11. The device of claim 1, wherein said addressable elements are addressable in a r.m.s. mode.*

*12. The device of claim 1, wherein the liquid crystal material has a birefringence $\Delta n$ approximately equal to or greater than 0.15.*

*13. The device of claim 1, wherein the liquid crystal material has induced strain.*

REEXAMINATION CERTIFICATE (3157th)
United States Patent [19]
Waters et al.

[11] B2 4,596,446
[45] Certificate Issued Mar. 18, 1997

[54] LIQUID CRYSTAL DEVICES WITH PARTICULAR CHOLESTRIC PITCH-CELL THICKNESS RATIO

[75] Inventors: Colin M. Waters; Edward P. Raynes, both of Malvern, England

[73] Assignee: The Secretary of State for Her Defence in Her Britannic Majesty's Government of the United Kingdom of Great Britain and Northern Ireland, London, England

Reexamination Request:
No. 90/004,198, Apr. 2, 1996

Reexamination Certificate for:
Patent No.: 4,596,446
Issued: Jun. 24, 1986
Appl. No.: 505,176
Filed: Jun. 17, 1983

Reexamination Certificate B1 4,596,446 issued Apr. 12, 1994

Certificate of Correction issued Jun. 19, 1996.

[30] Foreign Application Priority Data

Jun. 29, 1982 [GB] United Kingdom .............. 8218821

[51] Int. Cl.$^6$ .............. G02F 1/133; G02F 1/141; G02F 1/13
[52] U.S. Cl. ............. 359/55; 359/75; 359/98; 359/101
[58] Field of Search ............. 359/101, 98, 102, 359/55, 75

[56] References Cited

U.S. PATENT DOCUMENTS

| | | | |
|---|---|---|---|
| 3,551,026 | 12/1970 | Heilmeier | 359/48 |
| 3,731,986 | 5/1973 | Fergason | 359/85 |
| 3,833,287 | 9/1974 | Taylor et al. | 359/98 |

(List continued on next page.)

FOREIGN PATENT DOCUMENTS

| | | |
|---|---|---|
| 2356173 | 1/1978 | France . |
| 2158563 | 10/1975 | Germany . |
| 50-138851 | 11/1975 | Japan . |
| 52-79948 | 7/1977 | Japan . |
| 52-108838 | 9/1977 | Japan . |
| 54-115143 | 9/1979 | Japan . |
| 55-127520 | 10/1980 | Japan . |
| 55-146416 | 11/1980 | Japan . |
| 56-125723 | 10/1981 | Japan . |
| 56-162722 | 12/1981 | Japan . |
| 56-168636 | 12/1981 | Japan . |
| 57-133438 | 8/1982 | Japan . |
| 58-10729 | 1/1983 | Japan . |
| 58-118622 | 7/1983 | Japan . |
| 2074746 | 11/1981 | United Kingdom . |
| 2076554 | 12/1981 | United Kingdom . |
| 2087583 | 5/1982 | United Kingdom . |
| 2108698 | 5/1983 | United Kingdom . |
| 2127169 | 4/1984 | United Kingdom . |
| 2143336 | 2/1985 | United Kingdom . |
| 2145837 | 4/1985 | United Kingdom . |

OTHER PUBLICATIONS

Nara et al, J. Appl. Phys., 49(7), Jul. 1978; "Multiplexing for the Guest–Host Mode Using a Nematic Cholesteric Mixture with a Long Pitch"; pp. 4277–4279.

(List continued on next page.)

*Primary Examiner*—Anita Pellman Gross

[57] ABSTRACT

A liquid crystal device comprises a layer of long pitch cholesteric liquid crystal material incorporating a pleochroic dye. The layer is contained between two cell walls surface treated to align liquid crystal molecules in a tilted homogeneous structure. The surface alignment and natural pitch of the cholesteric material are matched to provide a progressive molecular twist of between $\pi$ and $2\pi$, preferably about $3\pi/2$, with a uniform tilt direction. The ratio natural pitch P divided by thickness d of the liquid crystal layer is arranged to lie between 0.5 and 1.0, with a value of d less than 20 µm. Both low tilt and high tilt surface alignment may be used separately or in combination. Polarizers may be used to enhance between ON and OFF states. The device has a sharp transmission/voltage characteristic which enables it to be used in large multiplex addressed matrix displays.

U.S. PATENT DOCUMENTS

| | | | |
|---|---|---|---|
| 3,960,438 | 6/1976 | Bonne et al. | 359/65 |
| 3,966,303 | 6/1976 | Yamamoto | 359/42 |
| 3,967,253 | 6/1976 | Tsuruishi | 359/54 |
| 3,977,767 | 8/1976 | Okuma et al. | 349/123 |
| 4,066,337 | 1/1978 | Kobale et al. | 359/54 |
| 4,077,900 | 3/1978 | Pohl et al. | 359/103 |
| 4,084,884 | 4/1978 | Raynes | 359/76 |
| 4,097,128 | 6/1978 | Matsumoto et al. | 359/53 |
| 4,235,526 | 11/1980 | Berman et al. | 359/75 |
| 4,241,984 | 12/1980 | Leibowitz | 359/63 |
| 4,426,133 | 1/1984 | Funada et al. | 349/103 |
| 4,577,930 | 3/1986 | Yang | 359/76 |
| 4,634,229 | 1/1987 | Amstutz et al. | 359/102 |
| 4,697,884 | 10/1987 | Amstutz et al. | 359/63 |

OTHER PUBLICATIONS

Schadt et al, J. Chem. Phys., 65(6), Sep. 1976, "Influence of Solutes on Material Constants of Liquid Crystals and on Electro–Optical Properties of Twisted Nematic Displays"; pp. 2224–2230.

Raynes et al, Mol. Cryst. Liq. Cryst., 34 (Letters), 1976, "Liquid Crystal Surface Alignment Treatment Giving Controlled Low Angle Tilt"; pp. 105–110.

Nonemissive Electrooptic Displays, Kmetz, A.R. et al, Eds., Plenum Press, New York, 1976, pp. 67–71 and 261–273, "Matrix Addressing of Non–Emissive Displays" and Liquid Crystal Color Displays.

Heilmeier et al, Appl. Phys. Lett, 13(3), Aug. 1968, "Guest–Host Interactions in Nematic Liquid Crystals. A New Electro–Optic Effect"; pp. 91–92.

Schadt et al, Appl. Phys. Lett., 18(4), Feb. 1971, "Voltage–Dependent Optical Activity of a Twisted Nematic Liquid Crystal"; pp. 127–128.

White et al, J. Appl. Phys. 45, Nov. 1974, "New Absorptive Mode Reflective Liquid–Crystal Display Device"; pp. 4718–4723.

Handbook of Physics, Condon, E.U. et al, Eds., McGraw-Hill, New York, 1967, pp. 6–124–6–125.

Uchida et al, Mol. Cryst. Liq. Cryst., 54, 1979, "Guest–Host Interactions in Nematic Liquid Crystal Cells with Twisted and Tilted Alignments"; pp. 161–174.

Merck Data Sheet for Hexyloxy–Cyano–Biphenyl (6OCB).

BDH Data Sheet for Pentyl–Cyano–Biphenyl (5CB).

Goscianski, M., J. Appl. Phys., 48(4), Apr. 1977, "Optical Characteristics of Twisted Nematic Liquid Crystals: Application to the Improvement of the Scanning Capability in Matrix Displays"; pp. 1426–1431.

Needham, Phil. Trans. R. Soc. Lond. A 309, 179–188 (1983), "Practical limits on addressing twisted nematic displays", pp. 109–118.

Scheffer, Phil. Trans. R. Soc. Lond. A 309, 189–201 (1983), "Guest–host devices using anisotropic dyes", pp. 119–131.

Schadt et al., IEEE Trans. on Electron Devices, vol. ED–25, No. 9 (Sep. 1978), "Physical Properties on New Liquid–Crystal Mixtures and . . . ", pp. 1125–1137.

Togashi et al., Mol. Cryst. Liq. Cryst., vol. 59 (1981), "White and Taylor Type Guest Host Displays Without Scattering Effects Using the . . . ", pp. 117–124.

Waters et al., Mol. Cryst. Liq. Cryst., vol. 123 (1985), "Design of Highly Multiplexed Liquid Crystal Dye Displays", pp. 303–319.

Brody et al., IEEE Trans. on Electron Devices, vol. ED–20, No. 11 (Nov. 1973) "A 6x6 Inch 20 Lines–per–Inch Liquid-Crystal Display Panel", pp. 995–1001.

Gerber, Appl. Phys. 25 (1981), "Calculated Correlations Between Material Parameters and Electro–Optical Performance of Twisted . . . ", pp. 259–268.

Scheffer et al., Appl. Phys. Lett. 45(10), Nov. 1984, "A new, highly multiplexable liquid crystal display", pp. 1021–1023.

Heffner et al., J. Appl. Phys. 53(12), Dec. 1982, "Switching characteristics of a bistable cholesteric twist cell", pp. 8599–8606.

Gooch et al., J. Phys. D: Appl. Phys., vol. 8 (1975), "The optical properties of twisted nematic liquid crystal structures . . . ", pp. 1575–1584.

Scheffer et al., J. Appl. Phys. 58(8), Oct. 1985, "Investigation of the electro–optical properties of 270° chiral nematic . . . ", pp. 3022–3031.

Kahn, Mol. Cryst. Liq. Cryst., vol. 38 (1977), "Capacitive Analysis of Twisted Nematic Liquid Crystal Displays", pp. 109–123.

Schadt et al., Mol. Cryst. Liq. Cryst., vol. 65 (1981), "Dielectric, Electro–Optical and Phase–Change Properties of Liquid Crystal . . . ", pp. 241–264.

Scheuble et al., Mol. Cryst. Liq. Cryst., vol. 68 (1981), "Elastic Properties of Liquid Crystalline Mixtures in Relation to Their Molecular Composition", pp. 57–67.

Raynes, Mol. Cryst. Liq. Cryst. Letters, vol. 4(3–4) (1987), "The Optical Properties of Supertwisted Liquid Crystal Layers," pp. 69–75.

Raynes, Mol. Cryst. Liq. Cryst. Letters, vol. 4(1) (1986), "The Theory of Supertwist Transitions," pp. 1–8.

Baur, Mol. Cryst. Liq. Cryst., vol. 63 (1981), "The Influence of Material and Device Parameters on the Optical Characteristics of Liquid . . . ", pp. 45–58.

Raynes et al., Mol. Cryst. Liq. Cryst., vol. 56 (1979), "Voltage Dependence of the Capacitance of a Twisted Nematic Liquid Crystal Layer," pp. 63–68.

Deuling, Mol. Cryst. Lid. Cryst., vol. 19 (1972), "Deformation of Nematic Liquid Crystals in an Electric Field," pp. 123–131.

Berreman et al., Proceedings of the SID, vol. 22/3 (1981), "Disclination–Free Bistable Twist Cells", pp. 191–193.

Bos et al., SID 83 Digest (1983), 6.2/11:25 A.M.: "A Liquid–Crystal Optical–Switching Device . . . ", pp. 30–31.

Kinugawa et al., SID 86 Digest (1986), 8.1: "640×400 Pixel LCD Using Highly Twisted Birefringence Effect with Low Pretilt Angle", pp. 122–125.

Waters et al., Proceedings of the SID, vol. 25/4 (1984), "Highly Multiplexable Dyed LCDs", pp. 261–264.

Scheffer, Adv. in Liq. Cry. Res. and Applns. (1980), "Bistability effects in twisted nematic layers", pp. 1145–1153.

Nehring, Adv. in Liq. Cry. Res. and Applns. (1980), "Matrix–addressed liquid–crystal displays", pp. 1155–1178.

Arai, Thesis for Degree of Master of Engineering, Mar. 1980, "Study on 270° Twisted Nematic Liquid–Crystal Cells".

Shimoda et al., The Physics and Chemistry of Liquid Crystal Devices (1980), "Anchoring Properties of Liquid Crrystals at the Substrates: . . . ", pp. 246–247.

Raynes, Electronics Letters, vol. 10, No. 9, May 1974, "Improved Contrast Uniformity in Twisted Nematic Liquid–Crystal Electro–optic Display Devices", pp. 141–142.

Berreman, Nonemissive Electrooptic Displays (1976), "Electrical and Optical Properties of Twisted Nematic Structures", pp. 9–24.

Gray; Critical Reports on Applied Chemistry, vol. 22, "Thermotropic Liquid Crystals", pp. 76–85.

Schadt et al., "Class Specific Physical Properties of Liquid Crystals and Correlations with Molecular Structure and Static . . . ", Feb. 1982, pp. 165–178.

Hiroshima et al., 26th Applied Physics and Related Subjects Conference, 30P–B–5, Mar. 1979, "The characteristics of 270° Twist Cells", pp. 1–2.

Arai et al., 5th Liquid Crystal Discussion Group, 1Q13, Oct. 1979, "The Characteristics of 270° Twist Cells (Report 2)", pp. 1–5.

Hiroshima et al., 27th Applied Physics and Related Subjects Conference, 1p–R–6, Oct. 1980, "The Characteristics of 270° Twist Cells (Report 3)", pp. 1–3.

Birecki et al., The physics and Chemistry of Liquid Crystal Devices (1980), "Effects of Cell and Material Properties on Multiplexing . . . ", pp. 125–142.

Ishii et al., 3W18 "Characteristics of White–Taylor GH–LCD Using a Long Pitch Liquid Crystal", Oct. 1982, pp. 126–127.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 34–40:

EXAMPLE 4

Cell thickness 8 μm, low tilt alignment
Material (B.D.H.) 3/5/7 CB 50% by weight
+3/5/7 CNPYR 50% by weight+*CB15*
$(V_2/V_1)_{T=20°}=1.072$
n=200

AS A RESULT OF REEXAMINATION, IT HAS BEEN DETERMINED THAT:

The patentability of claims 1–13 is confirmed.

New claims 14–31 are added and determined to be patentable.

*14. The device according to claim 13, wherein said induced strain is in a direction tending to twist the liquid crystal material to a shorter pitch.*

*15. The device of claim 1, wherein the thickness d equals 6 μm.*

*16. The device of claim 1, wherein the thickness d equals 8 μm.*

*17. The device of claim 1, wherein n equals the number of lines that can be addressed and n is greater than 32.*

*18. The device of claim 17, wherein n is at least 40.*

*19. The device of claim 4, wherein said thickness d is 8 μm.*

*20. The device of claim 4, wherein said surface treatment provides a low liquid crystal molecular tilt.*

*21. The device according to claim 20, wherein said low liquid crystal molecular tilt is less than 5°.*

*22. The device according to claim 21, wherein said low liquid crystal molecular tilt is 2°.*

*23. The device of claim 4, wherein thickness d is greater than 12 μm.*

*24. The device of claim 23, wherein said liquid crystal is a high birefringence material.*

*25. The device of claim 24, wherein $\Delta n \geq 0.15$.*

*26. The device of claim 4, wherein said liquid crystal is a high birefringence material.*

*27. The device of claim 26, wherein $\Delta n \geq 0.15$.*

*28. The device according to claim 4, wherein n equals the number of lines that can be addressed and n equals 200.*

*29. The device according to claim 4, wherein for any pixel in the display, the ON voltage is V2 and the OFF voltage is V1 where the ratio of V2 divided by V1 at a liquid crystal temperature of 20° C. is 1.072.*

*30. The device of claim 7, wherein said liquid crystal molecular tilt is no greater than 30°.*

*31. The device of claim 30, wherein said liquid crystal molecular tilt is 30° on at least one cell wall.*

* * * * *